United States Patent
Bekku et al.

(10) Patent No.: US 6,830,864 B2
(45) Date of Patent: Dec. 14, 2004

(54) METHOD FOR TRANSFERRING TRANSPARENT CONDUCTIVE FILM

(75) Inventors: Ichiro Bekku, Tokyo (JP); Tadahiro Furukawa, Tokyo (JP); Akiyoshi Murakami, Tokyo (JP); Kazumi Arai, Tokyo (JP); Hisashi Sato, Tokyo (JP)

(73) Assignee: Kyodo Printing Co., Ltd., Tokyo (JP)

( * ) Notice: Subject to any disclaimer, the term of this patent is extended or adjusted under 35 U.S.C. 154(b) by 0 days.

(21) Appl. No.: 10/027,289

(22) Filed: Dec. 20, 2001

(65) Prior Publication Data
US 2002/0055057 A1 May 9, 2002

Related U.S. Application Data

(63) Continuation of application No. 09/548,952, filed on Apr. 13, 2000, now Pat. No. 6,413,693.

(30) Foreign Application Priority Data

Apr. 19, 1999 (JP) .......... 11-110310

(51) Int. Cl.⁷ .......... G03C 1/805; G03F 7/11
(52) U.S. Cl. .......... 430/256; 430/259; 430/320; 430/321; 430/330
(58) Field of Search .......... 430/256, 259, 430/320, 321, 330, 20; 349/155, 143

(56) References Cited

U.S. PATENT DOCUMENTS

| | | | | |
|---|---|---|---|---|
| 5,155,005 A | * | 10/1992 | Sato et al. | |
| 5,411,792 A | * | 5/1995 | Yukinobu et al. | |
| 5,421,926 A | * | 6/1995 | Yukinobu et al. | |
| 5,650,263 A | * | 7/1997 | Wakata et al. | |
| 5,747,152 A | * | 5/1998 | Oka et al. | |
| 6,265,051 B1 | * | 7/2001 | Jean | 428/209 |
| 6,500,704 B1 | * | 12/2002 | Hirano et al. | 438/166 |
| 6,673,426 B1 | * | 1/2004 | Furukawa et al. | 428/213 |

* cited by examiner

Primary Examiner—Yvette C. Thornton
(74) Attorney, Agent, or Firm—Frommer Lawrence & Haug LLP; Ronald R. Santucci

(57) ABSTRACT

A method for transferring a transparent conductive film onto one surface of a sheet base material made of a plastic material, wherein the transparent conductive film as an object to be transferred is preliminarily formed on a substrate side which is superior in heat resistance to the plastic material, the transparent conductive film being sandwiched between a peelable layer which can be peeled off at the time of transfer and a protective film for protecting the transparent conductive film on the substrate side which is superior in heat resistance to the plastic material.

6 Claims, 3 Drawing Sheets

METHOD FOR TRANSFERRING TRANSPARENT CONDUCTIVE FILM

CROSS-REFERENCE TO RELATED APPLICATIONS

This application is a continuation of U.S. patent application Ser. No. 09/548,952 filed Apr. 13, 2000 now U.S. Pat. No. 6,413,693 entitled "Method for Transferring Transparent Conductive Film".

BACKGROUND OF THE INVENTION

This invention relates to a technique for forming a transparent conductive film on one surface of a sheet base material made of a plastic material by means of transfer, and more particularly to a technique of transfer in which a transparent conductive film as an object to be transferred is preliminarily formed on a substrate which is superior in heat resistance to a plastic material.

A transfer technique of this type is known as one of the techniques for forming a transparent conductive film serving as an electrode or wiring for an optical display unit such as a liquid crystal display unit. This transfer technique is basically a technique for preliminarily forming a transparent conductive film on a temporary substrate through a peelable layer and then transferring the transparent conductive film onto a separate sheet base material through an adhesive layer. The basic concept of such a transfer technique is disclosed, for example, in Japanese Unexamined Patent Publication (Kokai) No. Hei 2-174011. The adhesive layer is, under general practice, formed on a transparent conductive film which is formed on the temporary substrate. However, the adhesive layer is, in some instances, formed on the separate sheet base material.

As a transparent conductive film, metal oxides such as ITO (Indium Tin Oxide) and $SnO_2$ are used. The higher the temperature at which the film is formed, the lower the resistance, which those materials exhibit, is. In actual practice, it is demanded for those materials to have such characteristics that the specific resistance is $3.0 \times 10^{-4}$ ohm cm or less when the substrate temperature is, for example, 150 degree C. or higher. Accordingly, the material of the temporary substrate on which the transparent conductive film is formed should be selected from those which have more favorable heat resistance compared with the separate sheet base material on which the transparent conductive film is finally supported. Particularly, in the case where a plastic material is used as a separate sheet base material, the above material selection has vital importance. From such a view point, Japanese Unexamined Patent Publication (Kokai) No. Hei 11-24081 discloses a technique in which polyimide resin is used as a peelable layer and heat resistant polymer, which contains no fluorine atoms nor silicon atoms in the molecule and which has a glass transition temperature higher than the polyimide burning temperature of the peelable layer is used for the purpose of effectively forming a coating film from the polyimide resin.

As a result of extensive search and development with respect to the techniques for forming a transparent conductive film by means of transfer accompanied with experiments carried out by the inventors of the present invention, they paid attention to the fact that crack is liable to occur to the transparent conductive film when the film is transferred from the temporary substrate side onto the separate sheet base material. Further search and investment revealed that since the transparent conductive film has comparatively thin and fragile properties, it cannot withstand external force incurred thereto during the transferring operation, thus resulting in crack as mentioned above. The chief cause for generating the external force is the stress in accompany with the hardening/contraction of the adhesive agent used for adhering the transparent conductive film to the sheet base material side. This stress acts on the transparent conductive film when the temporary substrate is peeled off at the time of transfer. If such stress remains even after transfer, crack is liable to occur when stress such as high temperature, high humidity or the like is incurred. No prior art including the above-mentioned Publications shows such an idea that the transparent conductive film is protected from the stress incurred thereto from the adhesive agent side. Such a problem attributable to the stress is particularly significant when any one alone or any combination of ceramic, glass and metal (a metal material of a small thermal expansion such as 42 alloy, copper alloy or the like is preferred) having a larger rigidity compared with the sheet base material made of a plastic material is used in a singular form or in a laminated form as a heat resistant temporary substrate. In consideration of a pattern formation, such a temporary substrate is required to have the dimension stability against temperature and humidity and therefore, plastic material is not desirable for it.

SUMMARY OF THE INVENTION

It is, therefore, a first object of the present invention to provide a technique for effectively protecting a transparent conductive film from external force at the time of transfer.

It is a second object of the present invention to provide a technique for effectively controlling the thickness of an adhesive layer which could be a chief cause for generating external force.

In order to achieve the above objects, according to the present invention, a transparent conductive film preliminarily formed on a substrate side which is superior in heat resistance to a plastic material is transferred onto a sheet base material side made of a plastic material, wherein the transparent conductive film as an object to be transferred is formed on said heat resistant substrate in such a manner as to be sandwiched between a peelable layer which is peelable at the time of transfer and a protective film for protecting the transparent conductive film from being cracked. Since the transparent conductive film is protected by and between the peelable layer and the protective film at the time of transfer, the protective film on the adhesive layer side particularly acts in such a manner as to absorb or damp the external force thereby effectively preventing the occurrence of crack.

As one of the two elements for sandwiching the transparent conductive film, the peelable layer is required to have heat resistance enough for forming film from the ITO, etc. as a material of the transparent conductive film at a high temperature, adhesion to the ITO, etc., resistance against the etching process, etc. when the transparent conductive film is subjected to patterning treatment, and an appropriate degree of adhesion (such a degree of adhesion capable of being tightly adhered to the temporary substrate until the time the film is peeled off and capable of being peeled off without rendering any damage to the remaining layer, and which requires a peeling-off force of about several grams to 100 gram/cm when it is peeled off at 90 degree) with respect to the temporary substrate. The material of the peelable layer is preferably polyimide. In the case of a polyimide film versus a glass substrate in the comparative example 1 on page 7 of the above-mentioned Japanese Unexamined Patent Publication (Kokai) No. Hei 11-24081, there is a description that peeling-off is difficult. According to our experiments, however, the polyimide film can be peeled off without a need of any special treatment even in the case where the temporary substrate is glass. It should be noted here that polyimide exhibits different adhesion depending on its kind. The first one synthesized of pyromellitic acid anhydride and 4,4'-diaminodiphenyl ether exhibits rather poor adhesion with respect to the glass which is coated on its surface with $SiO_2$ and therefore, it is more suitable to be used as material of the peelable layer. On the other hand, the second one synthesized of benzophenone-tetracarboxylic acid anhydride or pyromellitic acid anhydride and 3,3'-diaminodiphenyl sulfone is superior in adhesion to the first one with respect to the glass. Moreover, its adhesion with respect to the glass is more enhanced when baked. Its adhesion is gradually decreased with the passage of time and exhibits no further change at a certain level. However, when the second one decreased in adhesion is baked again, its adhesion is recovered to its initial level. Although the first polyimide can be peeled off the glass even immediately after baking, its adhesion is decreased so quickly that it is peeled off even by washing in a few days (less than 1 g/cm at 90 degree peeling-off). In contrast, although the second polyimide cannot be peeled off the grass immediately after baking, it can be peeled off with the passage of time. It can be considered that such change in adhesion of polyimide is attributable to its moisture absorption. Accordingly, polyimide can be used as a peelable layer while taking such characteristics of polyimide into consideration. Also, the first polyimide can be optimized in adhesion with respect to the glass by adding silane coupling agent thereto.

On the other hand, the protective film as a counterpart element for sandwiching the transparent conductive film is a film for protecting the transparent conductive film with the help of the peelable layer. Examples of the material of this protective film may include not only such organic resin as alkyd (for example, EXP-1474, a product of Fujikura Kasei K.K.), acryl (for example, SS6917, a product of Nippon Goseigomu K.K.) and urethane but also inorganic compounds or hybrid resin of inorganic series and organic series. Silicon oxide and alumina are typical examples of the material of inorganic series. Further, coat-type organosilicon compounds, such as an alcohol solution (coating solution) of tetraalkoxy silane, can be used. When it is required to coat particularly thicker, a coating solution obtained by adding an organic composition to the alcohol solution of tetraalkoxy silane can be used (for example, merchandise name: Ceramate, C-533, ZRS-5PH available from Shokubai Kasei K.K.). The protective film is 0.5 to 2 micrometer in thickness, while the peelable layer is 0.1 to 2 micrometer in thickness and the transparent conductive film is 0.1 to 0.4 micrometer in thickness. From the view point of protection characteristics, the hardness is set to a value equivalent to H or more in pencil hardness (JIS K5401) and preferably 2H or more. In the case of a soft protective film, it becomes unable to support the stress generated from the transparent conductive film after transfer, and as a result, the transparent conductive film is liable to be deformed and cracked. When a color filter for color display is formed on this protective film, it is required to have such a function as to protect the color filter layer and the adhesive layer from the removal of the peelable layer and therefore, the material which can be used is limited.

As the transparent conductive film, such metal oxides as ITO, $SnO_2$, etc. which are mentioned above, can be used. Particularly, ITO, which is superior in such properties as transparency, specific resistance and the like, is preferable. The ITO, etc. can be formed by such a known method as sputtering, ion plating or electron beam deposition. As the heat resisting temporary substrate, ceramic, glass or metal can selectively be used either alone or in combination. Particularly, the glass substrate is preferable. The reason is that glass is superior in heat resistance and in addition, it allows the transparent conductive film, the color filter, etc. to be formed thereon in a correctly positionally aligned fashion. Glass can also be said as a desirable material from the relationship with polyimide which is the material of the peelable layer.

As the adhesive layer for adhering the transparent conductive film to the sheet base material side, those of an ultraviolet hardening type is preferable which can be hardened without heating. Among them, those of cation polymerization type, for example, ultraviolet hardening type adhesive agent of epoxy series are most preferable. The thickness of coating is about 2 to 20 micrometer, which is thick enough to obtain a satisfactory adhesive strength but thin enough not to sacrifice transmission. Such an adhesive layer sometimes provides such inconveniences that the film thickness distribution is not uniform and adhesive agent is exposed from the side depending on the pressing conditions at the time of transfer. In order to eliminate such inconveniences, it is preferred that the adhesive layer portion is provided with spacer means for controlling the thickness of the adhesive layer. As the spacer means, there can be used spacer particles mixed into the adhesive layer, a spacer pattern formed on the protective film or the like.

The sheet base material made of a plastic material can be used either in the form of a sheet or in the form of a roll. Its thickness is preferably in a range from 100 to 700 micrometer. Therefore, the sheet base material herein refers to a wide concept including all sheet-like members which include film, sheet and the like. The plastic as material of the sheet base material, may include polyester sulfone, polyester, polycarbonate, vinyl chloride, nylon, polyarylate, acryl, polyimide and the like.

DETAILED DESCRIPTION OF THE EMBODIMENT

One embodiment of the present invention will now be described in great detail with reference to the accompanying drawings.

Figure 1:
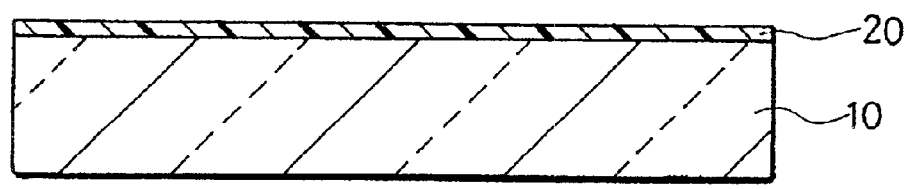
FIG. 1 is a sectional view showing a glass substrate with a peelable layer formed thereon.

First, as shown in FIG. 1, a washed glass substrate 10 is prepared and a transparent polyimide layer 20 is applied to one surface of the glass substrate 10 to form a peelable layer thereon. The glass substrate 10 is about 0.7 to 1.1 mm in thickness and it has rigidity as a whole. This glass substrate 10 serves as a substrate for supporting, on its surface, a transparent conductive film to be transferred, or the like. Therefore, it is preferred that the glass substrate 10 has a favorable surface smoothness (standard of the outer appearance of the substrate surface) at a level of smoothness as being unable to recognize such roughness as tiny recesses and projections when the glass substrate 10, which is exposed to reflected light of 5000 lux in a dark room, is visually recognized. The polyimide layer 20 is obtained by adding 0.1% solids content of silane coupling agent to the first polyimide and is 0.1 to 2 micrometer in thickness. This polyimide layer 20 is, of course, hardened by heating after being applied. As a matter of course, the glass substrate 10 can sufficiently withstand the heating for hardening polyimide.

Figure 2:
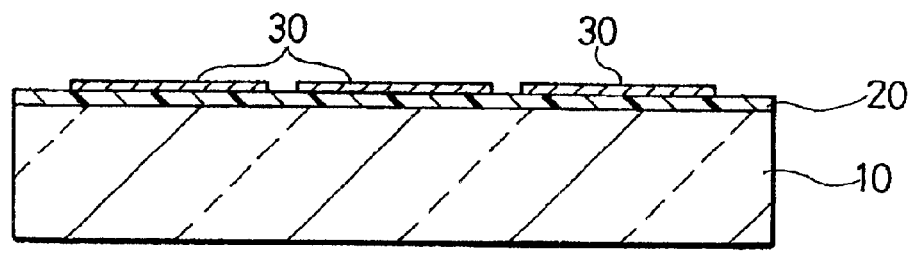
FIG. 2 is a sectional view showing a state in which a transparent conductive film is formed on the glass plate.
Figure 3:
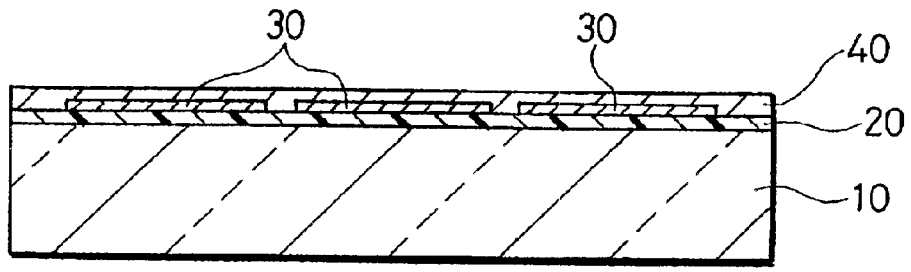
FIG. 3 is a sectional view showing a state in which a protective film is formed on the transparent conductive film pattern.

Then, as shown in FIG. 2, after a film of ITO is formed on the polyimide layer 20 of the glass substrate 10, it is subjected to patterning treatment so that a transparent conductive film 30 is formed. For forming the film of ITO, the temperature of the glass substrate 10 is set to 150 degree C. or higher so that a film having the above-mentioned small resistance can be obtained. Then, as shown in FIG. 3, an acrylic protective film 40 is formed in the thickness of 1 to 2 micrometer in such a manner as to cover the transparent conductive film 30 on the glass substrate 10.

Figure 4:
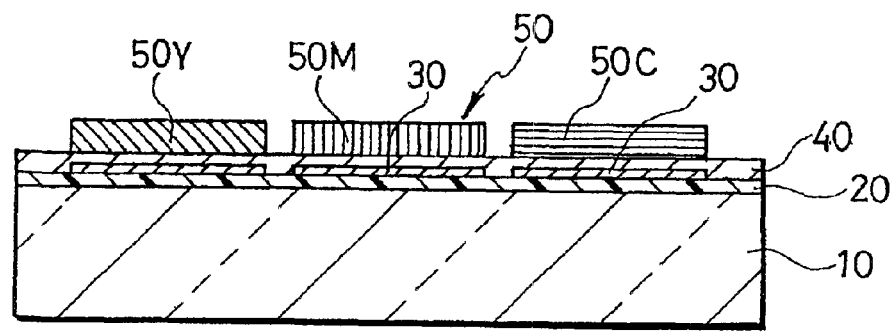
FIG. 4 is a sectional view showing a state in which a color filter layer is formed on the protective film.

Thereafter, as shown in FIG. 4, a color filter layer 50 including color patterns 50Y, 50M, 50C including yellow, magenta and cyan is formed on the protective film 40 by photolithography. The material of the color patterns 50Y, 50M, 50C may be the known coating material which is obtained by dissolving or dispersing such colorant as dye or pigment in a polyimide resin solution (for example, Japanese Unexamined Patent Publication (Kokai) No. Hei 10-170716. Each color pattern is of a stripe shape and 50 to 200 micrometer in width. The distance between the adjacent color patterns is 5 to 20 micrometer. The color filter layer 50 is of a reflection type and 0.2 to 2 micrometer in thickness. Since the color patterns 50Y, 50M, 50C on the color filter layer 50 and the ITO film which has been subjected to patterning treatment are aligned on the glass substrate 10 having a favorable dimensional stability, no inconveniences occur with respect to the patterning or aligning treatment.

Figure 5:
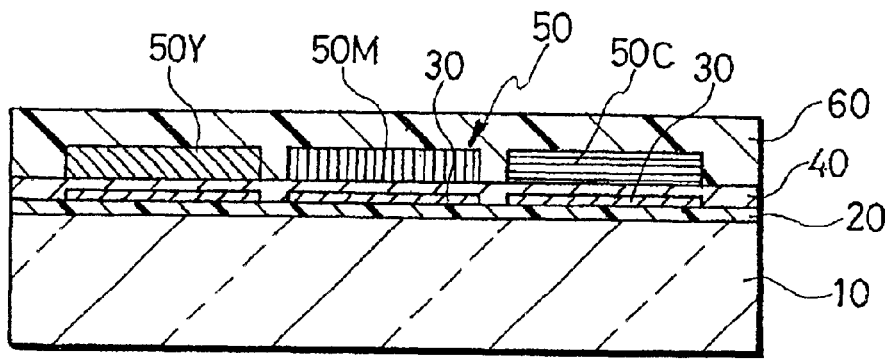
FIG. 5 is a sectional view showing a state in which an adhesive layer is applied onto the color filter layer.
Figure 6:
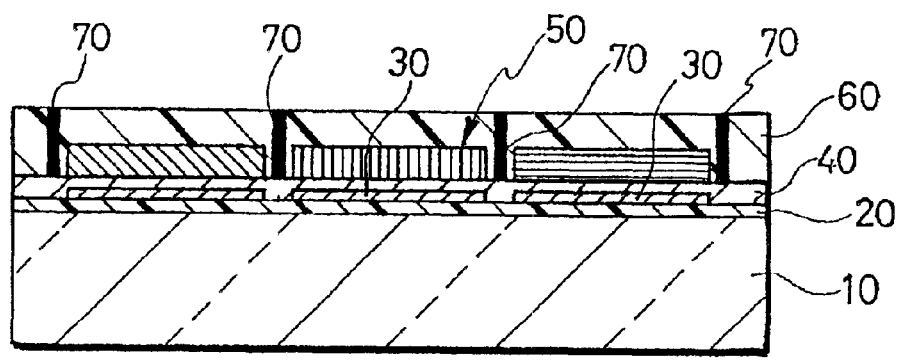
FIG. 6 is a sectional view in which a spacer pattern is used.

As shown in FIG. 5, an adhesive layer 60 is applied onto the color filter layer 50 in such a manner as to cover the entire surface thereof. The adhesive layer 60 is preferably of an ultraviolet hardening type. In this embodiment, a cation polymer type epoxy ultraviolet hardening adhesive agent (UV hardening resin KR500, a product of Asahi Denka Kogyo K.K.) is used. The thickness of the applied adhesive layer 60 (namely, the thickness of the coating) is set to about 2 to 20 micrometer. This thickness can provide a sufficient adhesive strength without sacrificing the transmittance. At that time, spacer particles such as, for example, 4 micrometer spherical particles of benzoguanamine (not shown) are mixed into the adhesive layer 60 as spacer means. The spacer particles are preliminarily added to the material to be applied and then applied onto the substrate 10. At that time, the adhesive agent is in a liquefied state and preferably controlled in coating thickness slightly larger than the particle size of the spacer. When the glass substrate 10 and a sheet base material 80 as a plastic sheet are laminated with each other in that condition, there can be obtained the adhesive layer 60 having a uniform film thickness all over the entire surface. With respect to the mixing amount of the spacer particles, the in-plane distribution amount is preferably adjusted to about 40 pc/mm$^2$. Although, the epoxy resin of the adhesive layer 60 is reduced, for example, about several percents in volume by photo-setting, the spacer particles are hardly reduced in volume. Accordingly, undue deformation and stress occur to the spacer particles portion as the adhesive layer 60 is reduced in volume. This causes, in some instances, the ITO film to be cracked. In order to avoid this undesirable crack, the particle size of the spacer should be set to a predetermined value or less. Specifically, it is preferably set to, for example, 5.5 micrometer or less. Instead of the spacer particles, a spacer pattern 70 of FIG. 6 may be employed as spacer means, which spacer pattern 70 is subjected to patterning treatment to form an island-like or stripe-like pattern at area (this area is not formed with the transparent conductive film 30 pattern) between the adjacent color patterns 50Y, 50M, 50C of the color filter layer 50. Owing to a provision of the spacer pattern 70, the transparent conductive film 30 is hardly susceptible to damage which would otherwise be caused to occur by undue deformation and stress. The spacer pattern 70 can be formed using a polyimide resin mixed with a black color material. In the case where a polyimide resin mixed with a black color material is used, there can be provided such an advantage that contrast is enhanced when the liquid crystal display is in the On-state.

Figure 7:
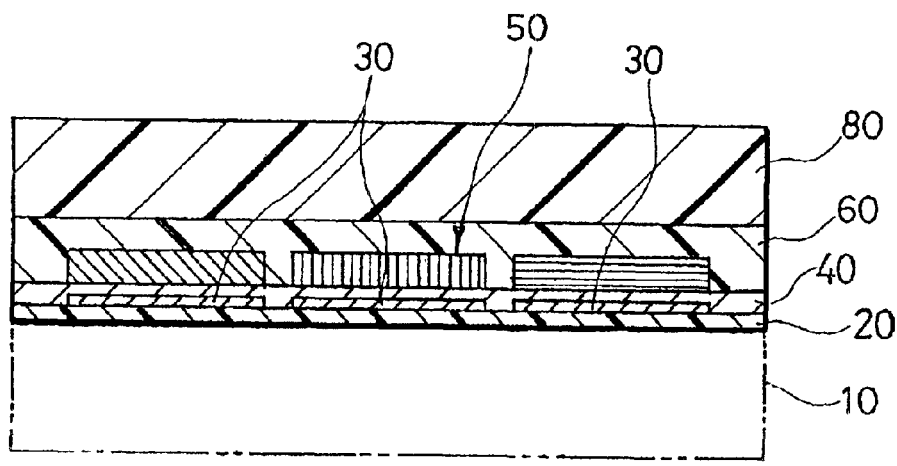
FIG. 7 is a sectional view showing a state in which a transferring operation is undergoing.

Thereafter, as shown in FIG. 7, the sheet base material 80 (100 to 700 micrometer in thickness) made of polyester sulfone is disposed on the adhesive layer 60 side and the transparent conductive film 30, the color filter layer 50, etc. are transferred from the glass substrate 10 side to the sheet base material 80 side. When the film 30, etc. are transferred, an ultraviolet ray is irradiated from the sheet base material 80 side and in addition, temperature increase due to such irradiation on the adhesive layer (object to be hardened) 60 side is positively restrained so that the temperature becomes as closer to a normal temperature as possible. Since the transparent conductive film 30, which is particularly readily damaged at the time of transfer, is sandwiched between the polyimide film 20 as a peelable layer and the protective film 40, it is effectively protected from external force attributable to hardening of the adhesive layer 60 and transfer. As a comparative example, transfer was carried out using the same type of material but without a provision of the protective film 40. As a result, cracks caused by hardening and contraction of the spacer particles, the spacer patterns and the adhesive agent were recognized at several spots of the transparent conductive film after transfer. Moreover, there was no means for effectively peeling off the peelable layer.

After transfer, the polyimide layer 20 as the peelable layer is removed. The reasons why the layer 20 is removed are that electrical connection is achieved between the transparent conductive film 30 and a driver IC for liquid crystal display and that effective voltage for actuating the liquid crystal is enhanced. For removing the polyimide layer 20, a wet etching using hydrazine-ethylenediamine is employed. At that time, the protective film 40 serves to protect the adhesive layer 60 and the color filter layer 50 from the etchant.

What is claimed is:

1. A method for transferring a transparent conductive film onto one surface of a sheet base material made of a plastic material, wherein said transparent conductive film as an object to be transferred is preliminarily formed on a substrate which is superior in heat resistance to the plastic material, said transparent conductive film being sandwiched between a peelable layer which can be peeled off at the time of transfer and a protective film for protecting said transparent conductive film on said substrate which is superior in heat resistance to the plastic material; said transparent conductive film being made of a metal oxide having a specific resistance of $3.0 \times 10^{-4}$ ohm-cm or less formed by sputtering, ion plating or electron beam deposition methods at a substrate temperature of 150° C. or more.

2. A transferring method according to claim 1, wherein said substrate which is superior in heat resistance to the plastic material is a substrate made of any one or a combination of ceramic, glass and metal, said peelable layer being made of polyimide resin.

3. A transferring method according to claim 1, wherein an adhesive layer is formed on said protective film which is formed on said substrate which is superior in heat resistance to the plastic material.

4. A transferring method according to claim 3, wherein said transparent conductive film is an electrode of a liquid crystal color display unit, a color filter layer for color display is formed on said protective film and said adhesive layer covers said color filter layer.

5. A transferring method according to claim 1, wherein said transparent conductive film is made of a metal oxide, said protective film being made of any one or a combination of organic resin and an inorganic compound.

6. A transferring method according to claim 1, the hardness of said protective film is set to a value equivalent to H or more in pencil hardness based on JIS K5401 test.

* * * * *